UNITED STATES PATENT OFFICE.

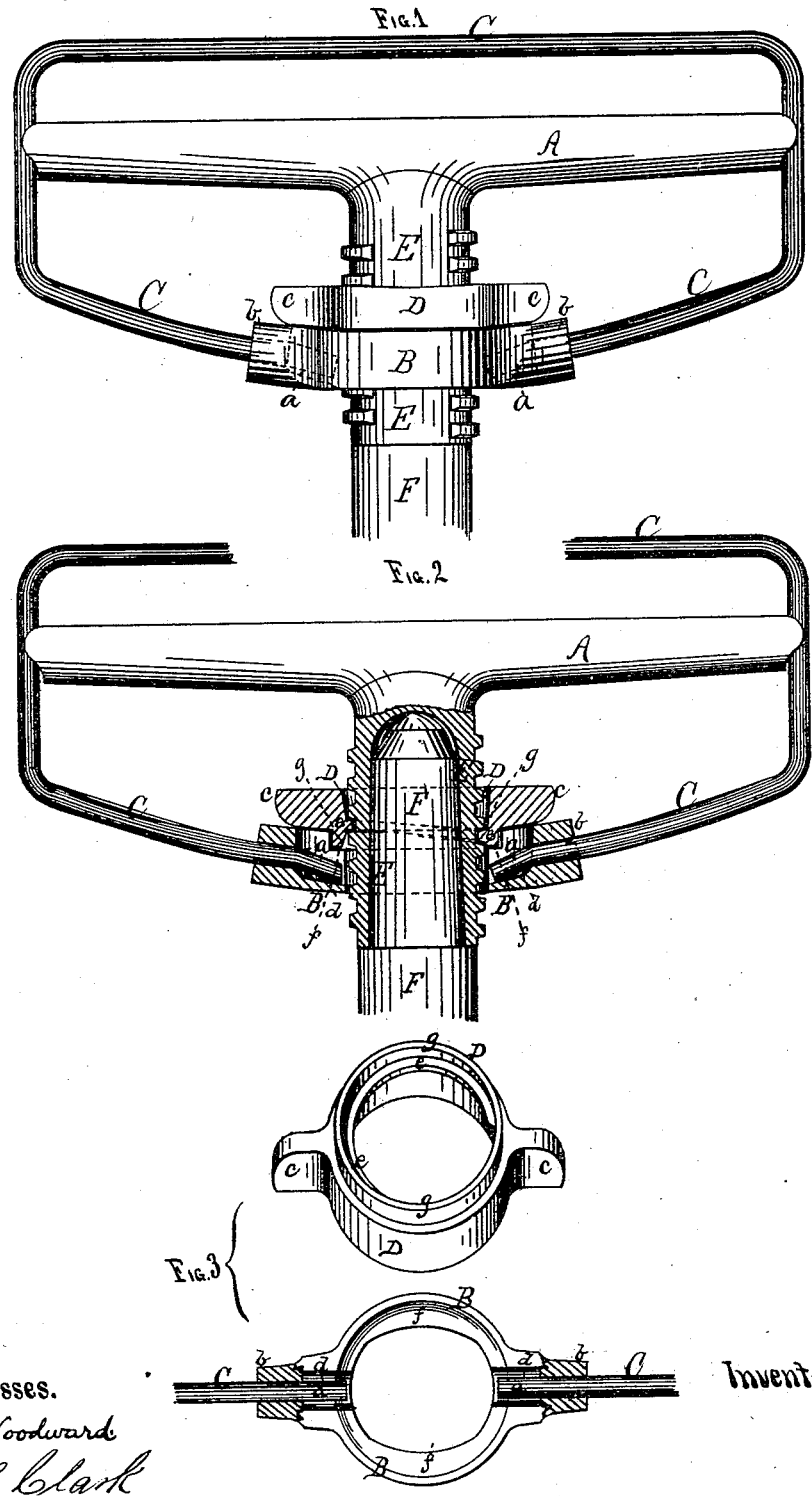

CHARLES B. CLARK, OF BUFFALO, NEW YORK.

IMPROVEMENT IN MOP-HEADS.

Specification forming part of Letters Patent No. 166,342, dated August 3, 1875; application filed July 6, 1875.

*To all whom it may concern:*

Be it known that I, CHARLES B. CLARK, of the city of Buffalo, county of Erie and State of New York, have invented a new and useful Improvement in Mop-Heads, of which the following is a specification:

My improvement relates to that class of mop-heads constructed with a fixed jaw and a yoke or collar carrying a movable wire jaw by means of a thumb-nut rotating upon the fixed jaw.

It is the object of my invention to simplify and strengthen the construction of the collar, and to secure thereto the ends of the binding-wire without the usual method of riveting the same, or of employing additional rivets to secure the wire between divided portions of the collar; also, to construct and arrange the thumb-nut so that the movable jaw may be quickly and efficiently operated. To this end the improvement consists in casting the collar in one piece, with an annular seat for the flange of the nut, and in casting therein suitable cavities, into which the ends of the wire are set or bent after passing through the drilled holes in the arms of the collar. It also consists in forming the thumb-nut with a flange, which fits into the annular seat of the collar when the jaws are clamped together, as hereinafter set forth and claimed.

Figure 1 is a side elevation of my improved mop-head. Fig. 2 is a sectional elevation of the same, showing the manner of securing the ends of the binding-wire to the collar. Fig. 3 is a detail view of the nut and collar, the arms of the latter being shown in section.

Like letters refer to similar parts in all the views.

In Fig. 1, A represents the cross-head, provided with the hollow shank E, into which the wooden handle F is fitted. B is the collar of the movable jaw C, and slides freely upon the shank E. The ends $a$ $a$ of the wire jaw C are attached to the arms $b$ $b$ of the collar B. This collar is cast in one piece, with an opening for the shank E, and with an annular seat, $f$, to receive the flange $g$ of the nut D. The arms $b$ $b$ of the collar B are drilled, the holes terminating in cavities $d$ $d$, into which the ends $a$ $a$ of the wire C, after passing through the drilled holes, are bent or set with a punch, which securely fastens them into the arms of the collar. This method of securing the wire to the collar is stronger and more compact than other means hitherto employed, and constitutes the main feature of my invention.

The thumb-nut D is provided with ears $c$ $c$ and an internal thread, $e$, which engages with the lugs on the shank E. The nut is placed underneath, and can be moved independently of the collar B, being in contact with it only when clamping the mop-cloth, in which case the flange $g$ of the nut enters the annular seat $f$ of the collar, as seen in Figs. 2 and 3.

The engagement of the nut and collar in this manner presents a large surface for adhesion, which prevents the nut working loose, and also allows a wide internal bearing of the nut upon the shank.

The ease and rapidity of rotating the thumb-nut in this mop permit a readier adjustment of the movable jaw than in those mops having the nut and collar connected and moving together, while its location beneath the collar guards the thumb-ears against all danger of breaking off.

The three pieces of castings composing this mop-head are easily molded, and require no extra fitting, except the drilling for the binding-wire, and when put together form a neat and superior article.

What I claim as new, and desire to secure by Letters Patent, is—

1. The solid collar B, provided with the cavities $d$ and hollow arms $b$, whereby the wire C is received and the ends $a$ bent down, as described and shown.

2. The combination of the nut D, having flange $g$, the solid collar B, having the annular seat $f$ and the cavities $d$, and a fixed and movable jaw, as set forth.

In witness whereof I have hereunto signed my name in the presence of two subscribing witnesses.

CHARLES B. CLARK.

Witnesses:
FRANK C. FERGUSON,
HENRY R. CLARK.